United States Patent
Nissinen et al.

(10) Patent No.: US 7,198,841 B2
(45) Date of Patent: Apr. 3, 2007

(54) PAPER HAVING A CELLULOSIC FIBER LAYER TREATED WITH ELEMENTARY PARTICLES

(75) Inventors: Vilho Nissinen, Numminen (FI); Timo Nyberg, Espoo (FI); Pasi Rajala, Turku (FI); Lars Grönroos, Tampere (FI); Pentti Virtanen, Toijala (FI); Veli Käsmä, Tampere (FI); Hannu Niemelä, Kuopio (FI)

(73) Assignee: Metso Paper Oy, Helsinki (FI)

( * ) Notice: Subject to any disclaimer, the term of this patent is extended or adjusted under 35 U.S.C. 154(b) by 0 days.

(21) Appl. No.: 10/700,440

(22) Filed: Nov. 4, 2003

(65) Prior Publication Data

US 2004/0096649 A1 May 20, 2004

Related U.S. Application Data

(62) Division of application No. 09/743,165, filed as application No. PCT/FI99/00604 on Jul. 7, 1999, now Pat. No. 6,680,086.

(30) Foreign Application Priority Data

Jul. 8, 1998  (FI) .................................. 981574

(51) Int. Cl.
*B32B 5/16* (2006.01)
*B32B 29/04* (2006.01)

(52) U.S. Cl. ...................... 428/330; 428/378; 428/379; 428/537.7

(58) Field of Classification Search ................ 428/330, 428/378, 379, 537.5, 537.7
See application file for complete search history.

(56) References Cited

U.S. PATENT DOCUMENTS

| | | | |
|---|---|---|---|
| 2,740,184 A | 4/1956 | Thomas | |
| 2,920,987 A | 1/1960 | Landry et al. | |
| 3,166,432 A * | 1/1965 | Gundlach | .................. 430/120 |
| 3,395,042 A | 7/1968 | Herbert, Jr. | |
| 3,523,319 A | 8/1970 | Stoever | |
| 3,536,528 A | 10/1970 | De Geest | |
| 3,670,203 A | 6/1972 | Whitmore, Jr. et al. | |
| 3,781,105 A | 12/1973 | Megher | |
| 3,879,785 A | 4/1975 | Roth et al. | |
| 3,943,049 A | 3/1976 | Zucker | |
| 3,959,690 A | 5/1976 | Leibrecht | |
| 4,133,894 A | 1/1979 | Shibazaki et al. | |
| 4,405,342 A | 9/1983 | Bergman | |
| 4,454,621 A | 6/1984 | Testone | |
| 4,677,704 A | 7/1987 | Huggins | |
| 4,727,614 A | 3/1988 | Swistun | |

(Continued)

FOREIGN PATENT DOCUMENTS

DE    32 29 383 A1    2/1984

(Continued)

*Primary Examiner*—Holly Rickman
(74) *Attorney, Agent, or Firm*—Cohen Pontani Lieberman & Pavane LLP

(57) ABSTRACT

A paper, board or non-woven product containing a fiber layer containing cellulosic fibers, plant fibers or other material suitable for making a paper, board or non-woven product. One surface of the fiber layer is treated with pigment particles. The web is treated with microscopic particles whose average size is so small as to permit the particles to adhere to each other by van der Waals forces.

3 Claims, 7 Drawing Sheets

U.S. PATENT DOCUMENTS

| | | | |
|---|---|---|---|
| 4,834,910 A * | 5/1989 | Fujii et al. | 252/511 |
| 4,835,808 A | 6/1989 | Hahne et al. | |
| 4,941,224 A | 7/1990 | Saeki et al. | |
| 4,955,991 A | 9/1990 | Torok et al. | |
| 5,093,309 A * | 3/1992 | Hart et al. | 503/227 |
| 5,100,440 A | 3/1992 | Stahel et al. | |
| 5,110,324 A | 5/1992 | Testone et al. | |
| 5,138,971 A | 8/1992 | Nakajima et al. | |
| 5,180,404 A | 1/1993 | Loreth et al. | |
| 5,211,760 A | 5/1993 | Kedarnath | |
| 5,244,542 A * | 9/1993 | Bown et al. | 162/164.3 |
| 5,257,079 A | 10/1993 | Lange et al. | |
| 5,421,901 A | 6/1995 | Whitney et al. | |
| 5,432,000 A * | 7/1995 | Young et al. | 428/372 |
| 5,585,426 A | 12/1996 | Williams et al. | |
| 5,637,432 A * | 6/1997 | Okado et al. | 430/108.6 |
| 6,143,064 A | 11/2000 | Virtanen | |
| 6,238,784 B1 * | 5/2001 | Mochizuki et al. | 428/32.28 |
| 6,287,368 B1 | 9/2001 | Ilmasti | |

FOREIGN PATENT DOCUMENTS

| | | |
|---|---|---|
| DE | 41 20 973 A1 | 1/1993 |
| EP | 0 524 415 S2 | 1/1993 |
| EP | 0 682 992 A2 | 11/1995 |
| FI | 973775 | 1/1999 |
| WO | WO 95/18885 | 7/1995 |
| WO | WO 96/23728 | 8/1996 |
| WO | WO 97/32934 | 9/1997 |
| WO | WO 98/11999 | 3/1998 |
| WO | WO 99/15731 | 4/1999 |

* cited by examiner

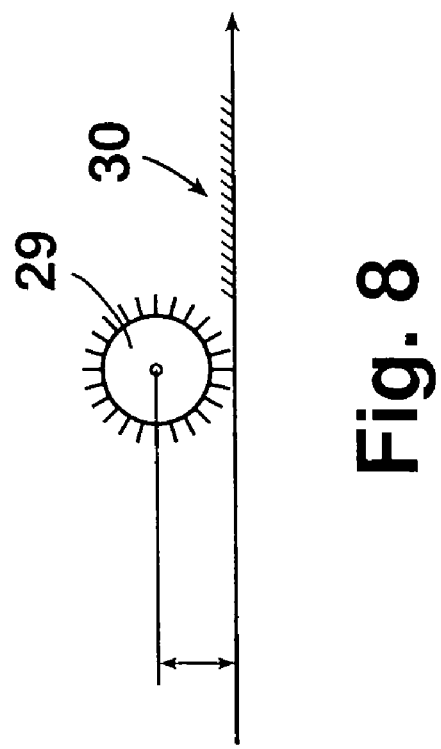
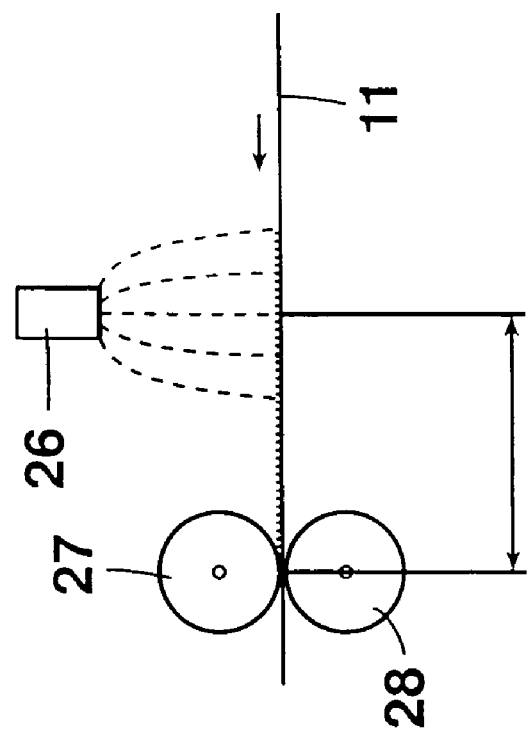

PAPER HAVING A CELLULOSIC FIBER LAYER TREATED WITH ELEMENTARY PARTICLES

CROSS REFERENCE TO RELATED APPLICATIONS

This is a division of U.S. patent application Ser. No. 09/743,165 filed Jan. 5, 2001, now U.S. Pat. No. 6,680,086 the specification of which is incorporated herein by reference.

PRIORITY CLAIM

This is a national stage of PCT application No. PCT/FI99/00604, filed on Jul. 7, 1999. Priority is claimed on that application and on patent application Ser. No. 981574 filed in Finland on Jul. 8, 1998.

FIELD OF THE INVENTION

The invention relates to method for manufacturing coated paper, board or similar product having a plant fiber base, in which method a layer of coating furnish is applied and adhered to a base web made of the fibers. The coating furnish at least partially consists of a carbonate compound.

The invention also relates to an apparatus suitable for implementing said method and a plant-fiber-based product coated with said carbonate-based coating furnish.

BACKGROUND OF THE INVENTION

In the context of the present application, the term "paper" is used when reference is made to any product produced on a plant fiber base such as a web of paper or board.

Generally, webs of paper and board are coated in order to enhance their printability properties. Among other things, the purpose of the coating is to improve the smoothness and whiteness of the base web and, particularly with thin base webs, to increase the opacity of the web material. Conventionally, the coating is applied to the base web surface as an aqueous suspension. There may be applied a plurality of coat layers and the application of the coat layers can be accomplished using a number of different methods. Since all the conventional methods apply the coating as an aqueous suspension, the drying of the coat forms a massive step in the coating process. Drying of the coat is an energy-intensive process and the drying of a fast moving web needs a long dryer section in order to direct a sufficient amount of drying energy to the web. Also the routing of the web to be processed is difficult, because the web cannot be guided by any members contacting it from its wet side until the coating has become adequately dry.

SUMMARY OF THE INVENTION

It is an object of the present invention to overcome the disadvantages of the above-described technology and to provide an entirely novel type of application method for coating a paper web.

The goal of the invention is achieved by forming the coating from microparticulate calcium carbonate or precursors thereof, said microparticulate coating being transferred to the web in dry form or as a suspension of a high solids content.

More specifically, the method according to the invention comprises forming a web from fibers, and treating the web with pigment particles having an average size in the range of 0.5–100 nm, most advantageously 15–25 nm.

Further, the apparatus according to the invention comprises means for supporting a web being formed, and means for forming calcium carbonate at least on the surface of the web. The means for forming calcium carbonate comprises at least means for feeding calcium hydroxide into contact with the surface of the web, and a chamber via which the web is adapted to travel and into which chamber is passed carbon dioxide containing gas in order to react carbon dioxide with calcium hydroxide so as to form calcium carbonate.

The apparatus according to the invention also comprises an electrically conducting moving wire having a first surface and a second side on a reverse side to the first side, the wire being adapted to support said web to be treated, and a means for feeding treatment material containing mineral-based components onto a web traveling on the first surface of the moving wire. At least one first electrode is positioned for forming a first potential field on the second side of the wire. At least one second electrode is disposed at a distance from the first side of the wire forming the first electrode. A high-voltage supply for elevating the voltage between the first electrode potential and the at least one second electrode high enough to establish a corona discharge in the vicinity of the second higher-potential electrode. The discharge is capable of causing an ion blast from the second higher-potential electrode to the wire forming the first electrode of the lower potential. As a result, the ion blast transports particles of the web-treatment material existing in the space between the potentials onto the web, and assuring the adherence of the raw material to the web.

Still further, the paper web product according to the invention comprises a fiber layer containing cellulosic fiber, plant fiber or other material suitable for manufacturing a paper, board or nonwoven product, in which at least one surface of the fiber layer is treated with elementary pigment particles of size in the range of 0.5–100 nm, most advantageously 15–25 nm.

The invention offers significant benefits.

By virtue of the invention, a web can be coated without using any water in the coating furnish, whereby also the web need not be dried during any step of the coating process and no equipment is required for preparing an aqueous coating mix. The overall length of the coater can be made shorter and its construction may be simplified. Because a major fraction of the energy consumed at the coater is used for drying the aqueous coating suspension, the invention offers significant savings in the specific energy consumption of coated paper grades. The invention may be combined with a dry base web-formation method (cf. Finnish Patent Application No. 973775), thus permitting the entire papermaking process to be carried out without any drying steps or, alternatively, using a minimal amount of water and drying. During web formation, calcium carbonate or its precursors can be fed into the fiber mass, whereby also the filler is introduced into the web. As known, calcium carbonate particles or the formation thereof in the web improves the interfiber bonding, whereby the web becomes stronger than a web containing no fillers.

By virtue of the invention, the paper surface can be provided with a coat of superior hiding power and smoothness. This kind of paper offers excellent printability. Moreover, coat defects such as streaking, orange peel patterning, uncoated patches and the like typically occurring in conjunction with blade, film-transfer and other known coating methods are eliminated. The dust of coating material can be effectively adhered to the web, whereby the soiling of the operating environment and equipment is smaller than with conventional wet coating methods. The method can be combined with known coating methods, thus permitting a dry coating to be applied on a wet coat and vice versa. The method can cost-effectively produce thick coats, because there is no need for intermediate drying between the application of successive coat layers and the thickness of a coat layer is limited only by the adherence of the coating to the web surface. To obtain heavy coat weights, it may be necessary to use binders that are applied to the web simultaneously with the coating or, during a separate step, under or over the coat. The calcium carbonate particles can be prepared in a separate process or coating equipment, or even directly onto the web.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the following, the invention will be examined in greater detail with the help of exemplifying embodiments illustrated in the appended drawings in which like reference numerals delineate similar elements throughout the several views.

FIG. 7 shows a seventh embodiment according to the invention; and

FIG. 8 shows an eighth embodiment according to the invention.

DETAILED DESCRIPTION OF THE PRESENTLY PREFERRED EMBODIMENTS

Figure 1:
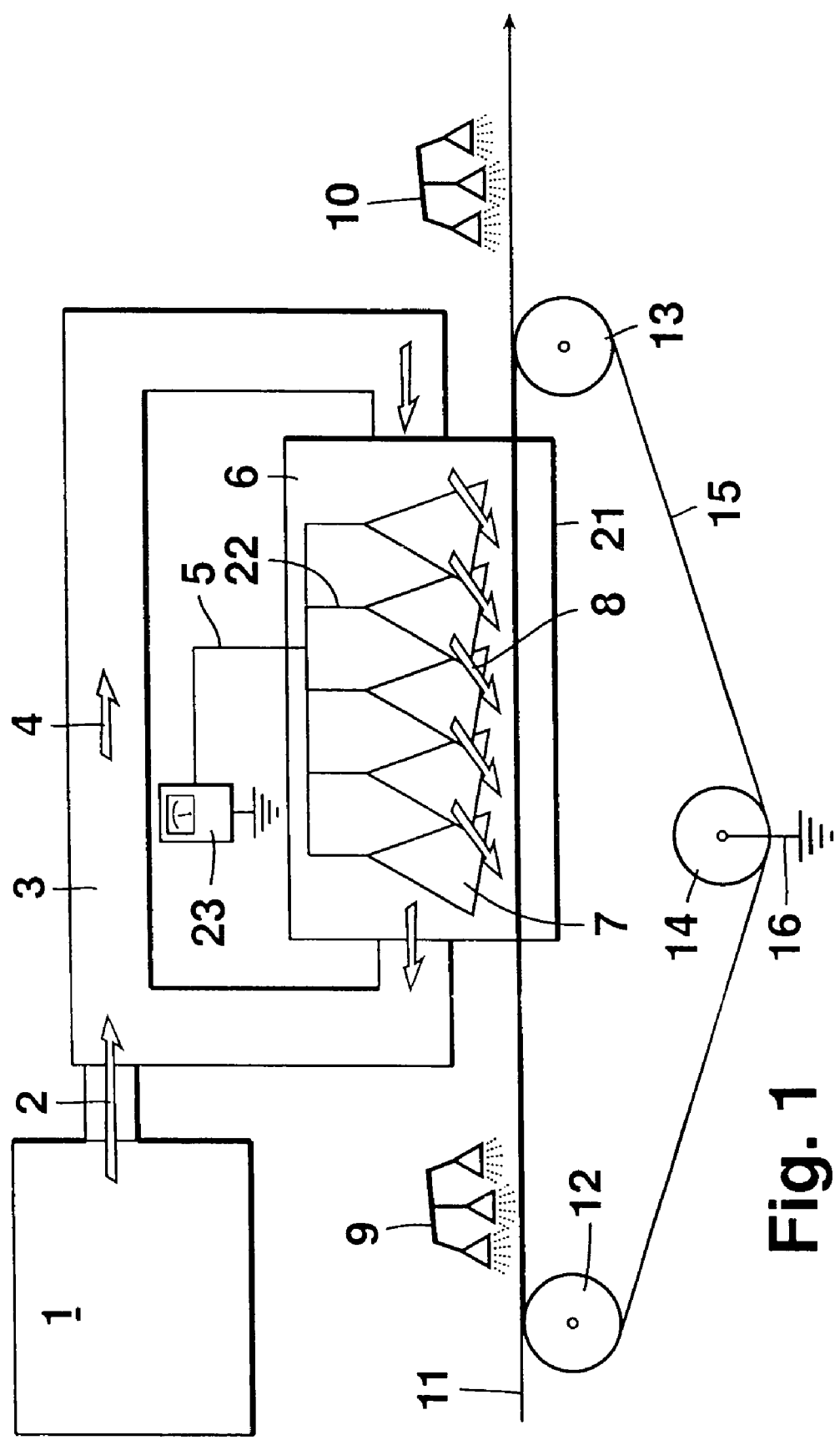
FIG. 1 shows a first embodiment according to the invention.

PCT Patent publication No. WO/96/23728 and Finnish Patent Application No. 964,365 describe a method for preparing extremely small and homogeneously sized PCC (Precipitated Calcium Carbonate) particles. In this method, PCC particles are formed from slaked lime CaO with the help of water and carbon dioxide in a direct gas-phase reaction, whereby extremely small particles are created with a diameter smaller than 100 nm, or even smaller than 20 nm. There is also described a method for coating particles of natural calcium carbonate with precipitated carbonate. Under suitable conditions, the prepared elementary particles floc into roundish aggregate particles of a cloudberry shape that have better rheological and optical properties than conventional PCC particles of needle-like shape. The size distribution of the flocced aggregate particles is very narrow and the flocced particles made using this technique are almost invariably smaller than 500 nm. The particles forming the aggregates are bonded to each other by van der Waals and capillary forces that become effective when the particles are disposed from each other at a distance smaller than 100 nm. On the other hand, the zeta-potential that characterizes the potential difference of the particle's ion field to the medium tends to separate the particles from agglomerating with each other. As the zeta-potential is strongly dependent on the pH of the particle, the formation and size of the aggregate particles can be affected by varying the degree of turbulence, or average mutual distance, and pH of the particles tending to aggregate together. If the degree of turbulence in the particle flow is sufficiently high, the elementary particles can be kept apart from each other. A more detailed description is given in the cited patent applications.

In the most advantageous embodiment of the invention, the use of PCC made using the novel technique is combined with application to a web by means of ion-blasting. Thus, when PCC is transferred, e.g., by ion-blasting to the web surface, the particles are bonded directly to each other and the web surface by van der Waals and other forces even without using any additional binder. As a result, the web is coated with a homogeneous and hiding layer of carbonate particles that has the same toughness as the single carbonate aggregates even though it smoothly covers the entire web of fibers. Coat application may also be accomplished using a gas flow, whereby a flow is directed tangential to the web surface and performs so as to smooth away the irregularities of the web surface when the particulate matter coating accumulates in the depressed points of the web in the same manner as drifting snow. The carbonate particles may also be impinged with a high velocity perpendicular to the web, whereby the carbonate particles penetrate into the interstatial spaces between the web fibers thus introducing a filler into the base web. By virtue of this technique, the web-formation section of a paper machine can be constructed without a filler feed system.

Slaked lime and/or calcium hydroxide can be transferred to the web surface, e.g., at the press section of the paper machine by gas flow or, alternatively, by ion-blasting. Subsequently, the calcium oxide is let to react with water fog, liquid water or steam to form calcium hydroxide, after which the web is taken to a carbon dioxide atmosphere and there the reaction is continued forming calcium carbonate on the web surface, wherein the carbonate particles thus formed adhere to the web. When the method is combined with dry formation of the base web, the calcium oxide or calcium hydroxide can be introduced as one constituent of the web and then reacted into calcium carbonate. Herein, the web dry-forming step can be performed so that into the formed web of fibers are introduced nano-size particles of calcium carbonate that in the mix of fibers bond the fibers and particles into a strong web. Thus, it is possible to form a web entirely from a dry furnish and, furthermore, to replace a fraction of the fibrous raw material with calcium carbonate, whereby the amount of fibrous raw material can be reduced to a minimum from that customarily required in a finished web.

An important feature of the invention is the possibility of recycling the calcium carbonate of deinked waste paper by feeding the precipitated calcium carbonate of the deinking process to a calcination plant. The calcium oxide obtained from the calcination plant can be treated into precipitated calcium carbonate that may then be used in the manner described in the cited publications and the present application.

The present application utilizes the so-called ion-blast technique. This technique is based on forming a strong electric field, between one or typically a plurality of pointed electrodes and one planar counterelectrode. The tip of the pointed electrode emits a corona discharge that charges particles located in the vicinity of the electrode tip thus causing the generation of ions in the electronegative gaseous medium. The ions migrate along the field lines extending between the electrode and the counterelectrode which is taken to the ground potential or to a lower potential, whereby the ions adhere to particles they meet on their travel. The electric field transports the charged particles over the interelectrode gap toward the ground-potential electrode, where they attach to the substrate by electric and mechanical forces. If the distance between the opposed electrodes is large and the applied voltage is high (more than 50 kV), a gas flow is established between the opposed electrodes that mechanically transports the charged particles toward the ground potential. This flow is conventionally known as ion blast. In the ion-blast phenomenon, the electric field exiting from the tip of the electrode forms a conical field pattern in which the ionized gas and charged particles move. Ion blast can transport both solid particles and liquid droplets.

In papermaking, the ion-blast technique can be utilized for binding a raw material to a web-formation substrate or for transferring and adhering the coating to the surface of a paper or board web. Basically, the substrate can be any surface permittive to the electric field or, alternatively, an electrically conducting surface. As the web in a continuous process must be formed on a moving surface, the web-formation substrate conventionally is a wire, felt or belt. In principle, the dryer the raw material of the web the smoother the surface can be on which the web is formed. In coat application, the formation substrate is the surface of a paper or board web.

In FIG. 1 is shown one embodiment of the invention. The calcium carbonate particles are here formed directly in a gas phase in a chamber 1 as described in above-cited patent applications and are taken therefrom via a tube 2 into a particle circulation path 3 formed by a circular tube. In the particle circulation, there is maintained a continuous flow (denoted by arrow 4) serving to keep the particles in a continuous motion and preventing their floccing into excessive large aggregates. Additionally, floccing can be controlled by altering the pH of the particulate matter fed into the circulation, whereby the zeta-potential of the particles is lowered and the floccing tendency is reduced. Correspondingly, the aggregate size can be increased by elevating the pH level of the particles. The particle circulation tube 3 is passed to an ion-blast zone 6 formed into a chamber 21. Through the chamber 21 is also passed a paper or board web 11 to be coated, as well as a conducting wire 15 supporting the same. In FIG. 1, the web is shown travelling from the left to the right. The wire 15 passes over guide rolls 12, 13, 14 so as to form an endless loop. The wire 15 is grounded or taken to a low potential via a connection 16 made to a guide roll 14, for instance.

In the interior of the ion-blast chamber 21 and directed toward the web 11 and the wire 15, there are a plurality of pointed-tip electrodes 22 connected via a conductor 5 to a power supply 23. From the power supply, a high potential relative to the conducting wire 15 is applied to the electrodes 22, whereby between the electrodes and the wire is created an ion-blast zone 7 of conical flux tubes of the electrical field that directs the particulate matter flow toward the web 11. As the field lines leaving the tip of each pointed electrode 22 form a flux tube of a conical shape, the number and location of electrode tips must be configured so that the conical flux tubes leaving the staggered electrode tips provide a uniform field on the surface of the web 11. The applied electrode voltage is dependent on the distance between the counterelectrode formed by the conducting wire 15 and electrode tips 22 that may be varied from 2 mm to 2 m; however, to keep the space requirements of the coating furnish feed equipment within practicable limits, an interelectrode distance range of 100–1000 mm is favoured. While a large inter-electrode distance as such does not impair the function of the apparatus, it increases the external dimensions of the system and complicates the behaved control of material flows in the chamber 21. When using a design based on the practicably most favourable interelectrode distance range, the voltage applied between the opposed electrodes is typically set in the range 80–160 kV, but may be varied as widely as from 30 kV to 1000 kV. The counterelectrode may be run positive or negative, and the electrode tips may respectively be connected to the negative or positive terminal of the power supply.

As the particle flow fluidized by the carrier gas is continuously circulated via the chamber 21, the direction of the particle flow is affected by the velocity vector of the circulation and, hence, the direction of the particle path is incident on the web in the reverse direction to the travel of the web 11 as indicated by arrow 8 in the diagram. When the particles hit the surface of the web 11, they are brought to a close distance from each other and the fibers of the web, whereby they become attached to the fibers and each other due to van der Waals and other forces, thus forming a tight and uniform layer of coating. Furthermore, the particle flow which is blasted obliquely against the travel of the web surface accumulates calcium carbonate particles in the depressed points of the web surface, whereby the profile of the coated surface becomes smoother. The adhering capability of the particles can be further improved by treating the web 11 with water or chemicals sprayed thereon prior to its entry in the ion-blast chamber. As known, water establishes hydrogen bonds between the fibers of the paper web and also improves the bonding of the calcium carbonate particles to the fibers and to each other. The coated web 11 may be further treated by a binding agent, water or chemicals sprayed from nozzles 10 located after the ion-blast chamber 21. It must be noted that the amount of water used in the method according to the invention is very minimal as compared with methods based on applying the coating as an aqueous suspension to the web. Hence, the need for high-capacity dryers is eliminated.

Figure 2:
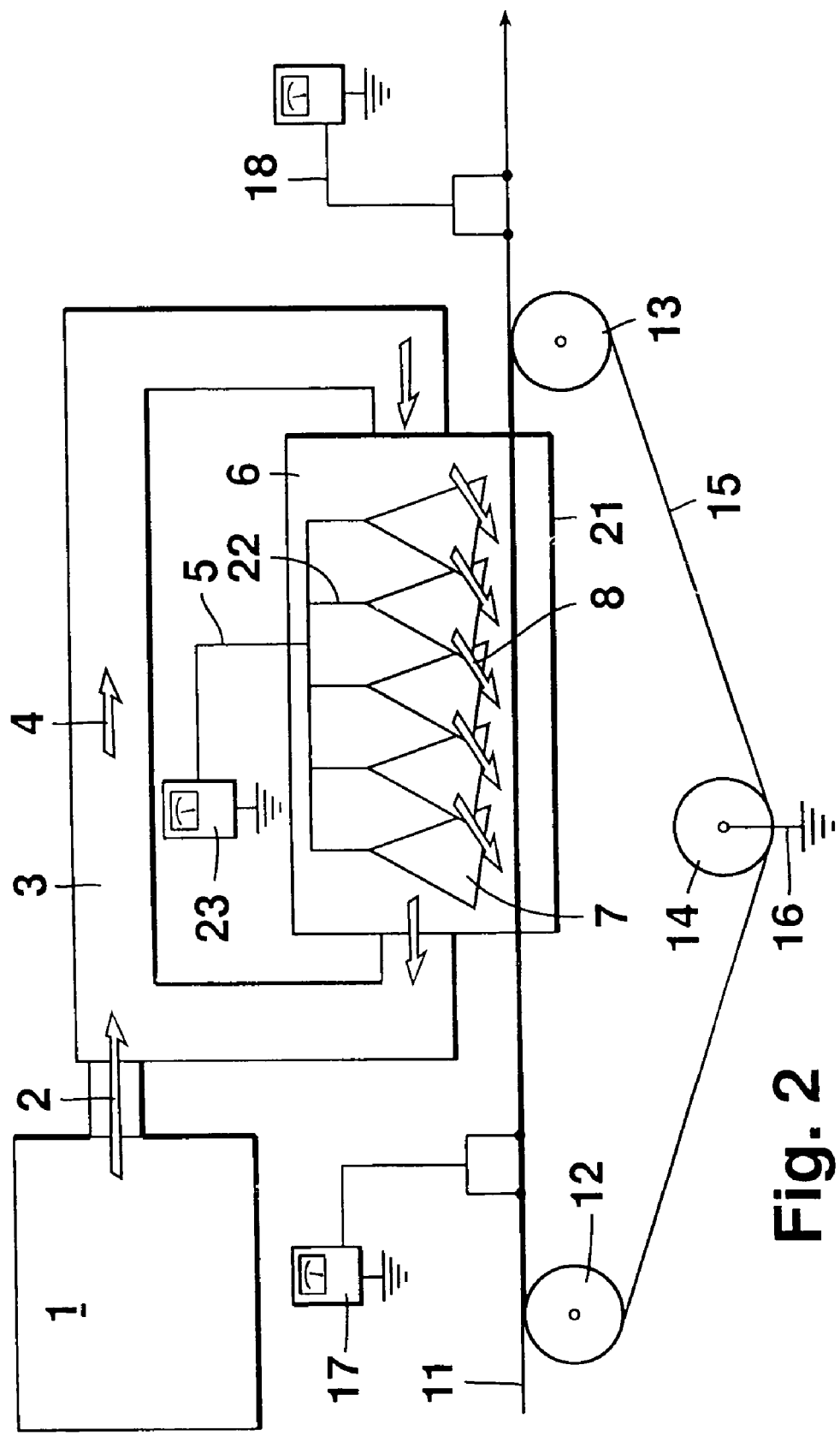
FIG. 2 shows a second embodiment according to the invention.

The ion-blast apparatus may under some conditions act as a capacitor that accumulates an electric charge, whereby the forces adhering the web to the conducting wire become unwieldy after the web has exited from under the counterelectrode. To discharge such adhering forces, a positive-or negative-potential corona discharge treatment 18 shown in FIG. 2 can be applied downstream from the web-formation section. Instead of having a pointed tip, the electrodes 22 of the ion-blast apparatus may be planar or rail electrodes, and respectively, the counterelectrode need not necessarily be taken to the ground potential with the provision that its potential must obviously be lower than that of the corona-discharge-emitting electrodes. Also the ion-blast chamber 21 may be preceded by a corona discharge device 17 serving to bring the web surface to a suitable potential and to adhere the web to the conducting wire at the meeting point of the web with he wire.

Figure 3:
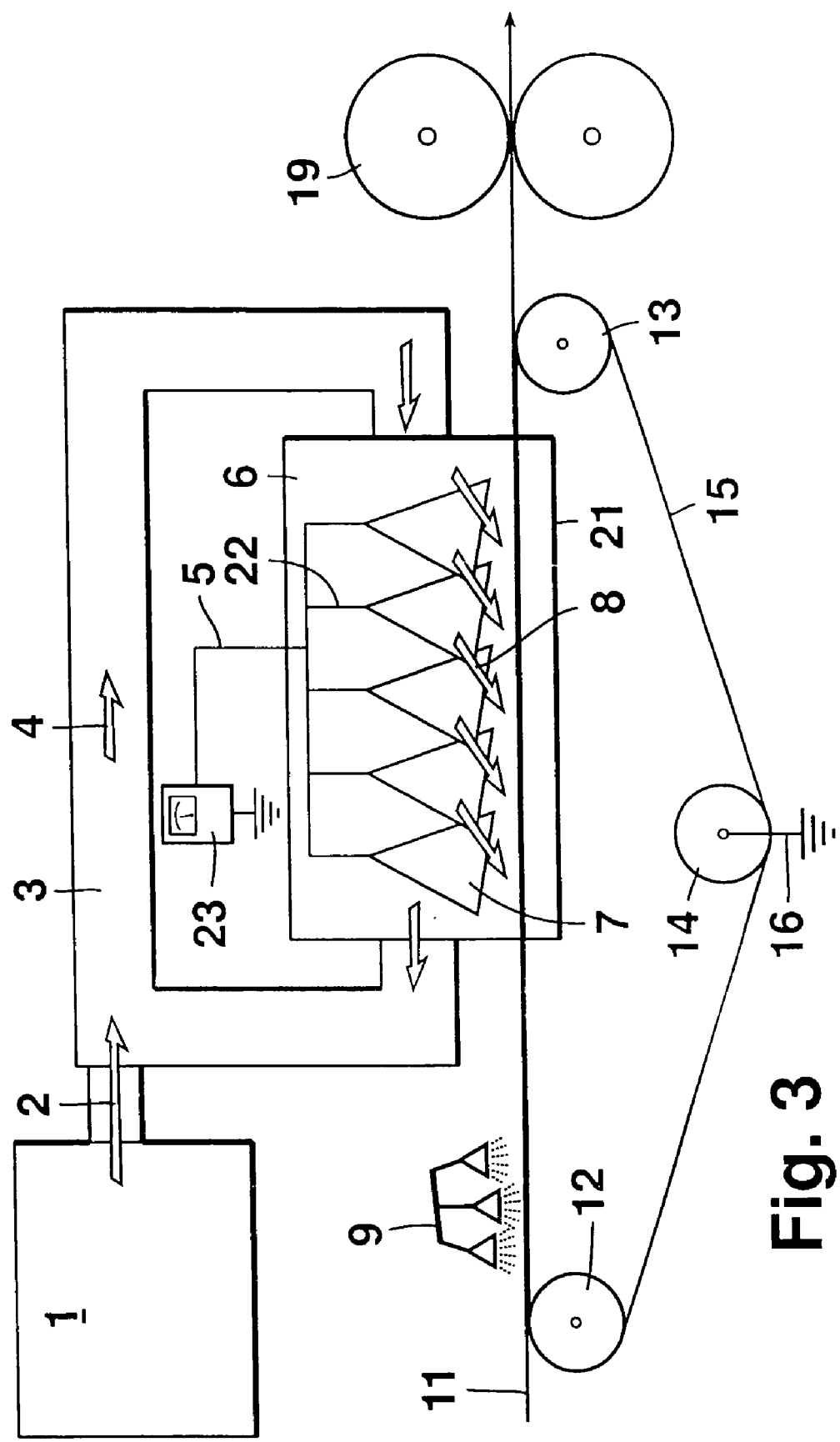
FIG. 3 shows a third embodiment according to the invention.
Figure 4:
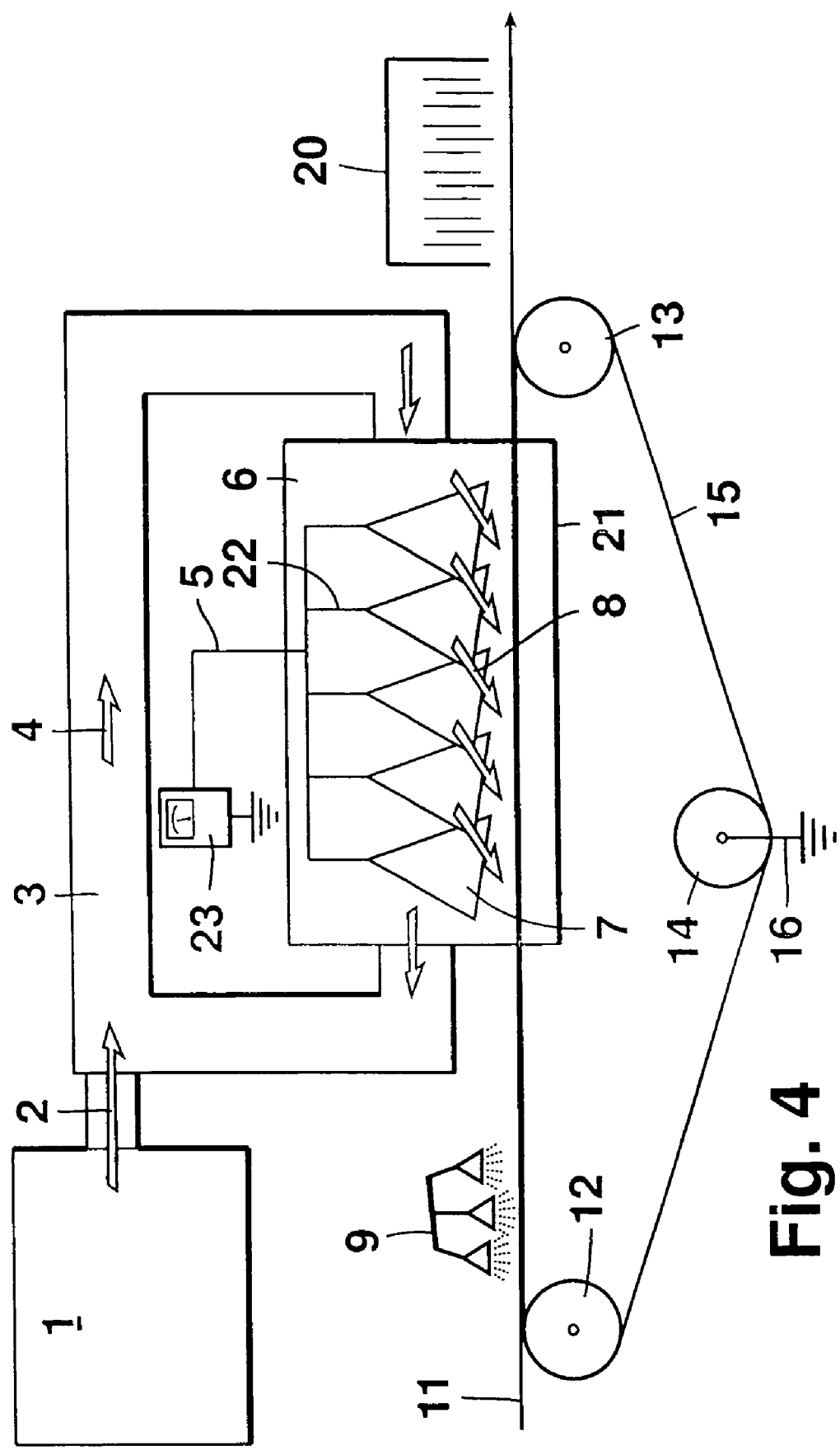
FIG. 4 shows a fourth embodiment according to the invention.
Figure 5:
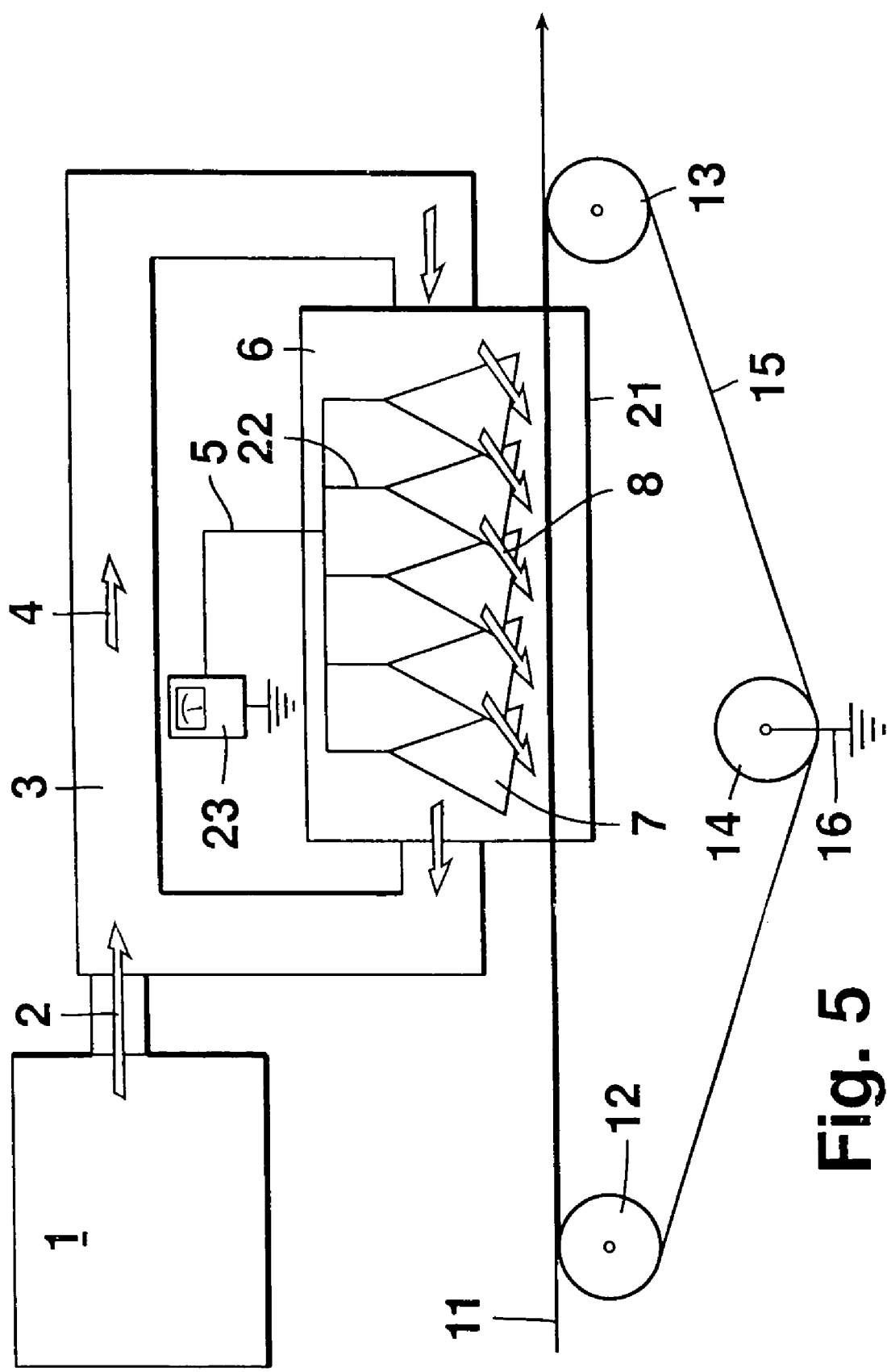
FIG. 5 shows a fifth embodiment according to the invention.

The bonding strength of the coating to the web fibers may also be enhanced by a mechanical or thermal treatment or a combination thereof as shown in FIG. 3. In this configuration, on the travel of the web after the ion-blast chamber 21 there is arranged a pair of rolls 19 having the web 11 being treated passing through the compressive nip between the rolls. Since the web is practically dry, it can be passed directly into the nip of the compressive rolls. The rolls 19 may be, e.g., of the same type as the rolls used in calenders and the web finishing treatment can be performed using force levels equivalent to those used in calendering, thus permitting the finished web surface to receive gloss simultaneously with gaining an improved adherence of the coat. In conjunction with a surface treatment similar to calendering, it is advantageous to control the web moisture content to a proper level by means of water or mist ejected from nozzles 9. The web may be treated with water spraying or steam injection also before it passes over the rolls. In the embodiment shown in FIG. 4, the adherence of the coating is enhanced by means of electromagnetic radiation. The radiation emitter is denoted by reference numeral 20 and the type of radiation applied may be infrared, ultraviolet, radioactive or x-ray radiation or microwave energy. A particularly advantageous technique is to combine the application of radiation with web treatment by a chemical responsive to the radiation used. Such treatment chemicals can be applied to the web in the above-described manner either in front of or after the ion-blast chamber. In FIG. 5 is shown a simplified embodiment of the invention, in which the nano-size coating particles are adhered to the web and each other by van der Waals forces alone without using any other treatments.

Figure 6:
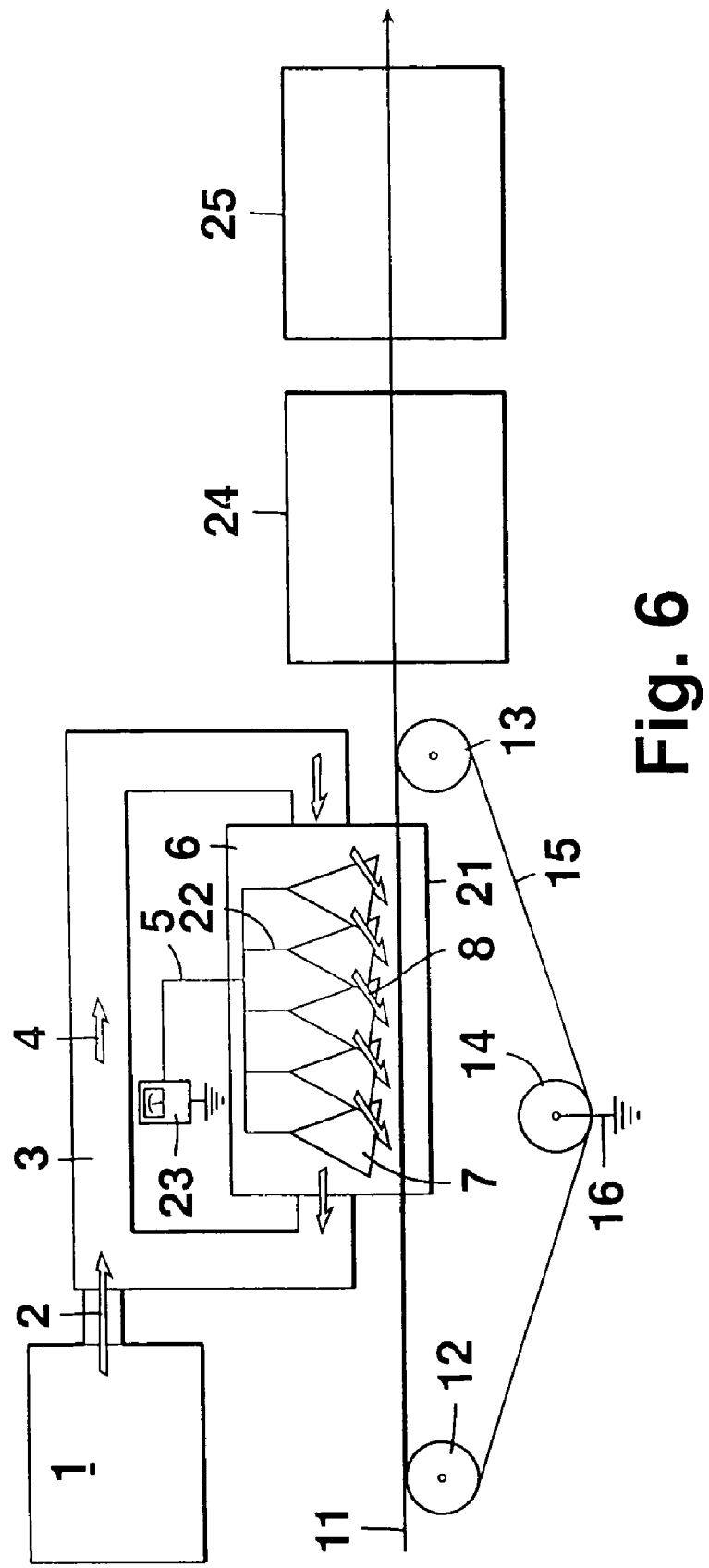
FIG. 6 shows a sixth embodiment according to the invention.

In FIG. 6 is shown a method and apparatus for forming a carbonate coating layer directly from precursors on the surface of the web 11. In this method, the ion-blast chamber 21 with its coating particle circulation and the structure of the conducting support belt are similar to those of the above-described apparatuses. The difference herein is that the particle circulation in the present case is fed with slaked lime particles CaO that are transferred to the web surface by ion-blasting. Next, the web is passed into an enclosure 24 where water is applied to the web, e.g., under a steam or mist atmosphere. Alternatively, the water may be introduced as mist or steam in the ion-blast chamber 21 or using any other suitable technique. When the slaked lime CaO reacts with the applied water, calcium hydroxide $Ca(OH)_2$ is formed. Next, the web 11 is passed into a chamber 25 enclosing a carbon dioxide atmosphere partially or purely comprised of carbon dioxide, whereby the calcium hydroxide $Ca(OH)_2$ reacts with the carbon dioxide so as to form calcium carbonate particles on the web surface. The water released in the reaction is discharged from the chamber. When desired, the adherence of the formed particles to the web surface may be secured by ion-blasting, whereby also a blast of carbon dioxide gas can be directed to the web surface.

Alternatively, a blast of powdered calcium hydroxide may be directed to the web surface, whereby the reaction described above is effected under a carbon dioxide atmosphere. Again, the applied powdered material and the carbon dioxide gas can be directed to the web and adhered thereto by means of ion-blasting. Further alternatively, the calcium hydroxide may be introduced to the web surface as an aqueous solution by spraying from jet nozzles, whereby the required carbon dioxide can be blown along with the atomizing air of the jet nozzles via orifices made to the jet nozzles. In the latter case, the reaction forming the calcium carbonate occurs partially airborne and partially on the web surface. When using particulate PCC, the agglomeration of the formed particles can be impeded by introducing external energy in the manner described, e.g., in conjunction with the discussion above related to FIG. 4. To enhance the adherence of the particles, the surface charge states of the paper web fibers may be altered by various physical or chemical treatments using, e.g., alum, polymer, electrolytic or corona discharge treatments and altering the pH level of the process. The coating structures thus formed may be processed further using the above-mentioned types of treatments and mechanical treatments such as calendering.

In addition to those described above, the present invention may have alternative embodiments.

The coating material consisting of nano-size PCC that was used in dry-coating tests is formed in a gas phase without a slurrying step in an aqueous medium. The native particles are in amorphous form and their crystallization takes at least some seconds or minutes. In its amorphous form, the workability of the material is much better than that of a crystalline material. However, after some time the material undergoes crystallization and the workability of the material decreases which means that its stiffness increases. This phenomenon may be utilized in the surface treatment of a paper or board web. In tests performed, it has been found that the nano-size PCC is not in crystallized form directly after the coating process, but after some time the crystallization of the particles can be seen as scattering points under a microscope.

In its amorphous form, that is, immediately after the carbonization of calcium hydroxide, the applied coating is readily workable. Hence, the nano-size PCC should be calendered or otherwise smoothed immediately after the application. Then, the calendering effect is imposed on the readily workable amorphous, cloudberry-like calcium carbonate aggregates (nano-size PCC). The aggregates are durable under the plastic deformation and can be levelled under the calendering pressure to form a smooth surface. Also the individual aggregates undergo a plastic deformation. As a result, a surface with an extremely smooth and level profile is obtained. The levelling of the web surface to a smooth profile immediately after application may be implemented using the following techniques:

a) cold calendering involving mechanical compaction, whereby the fixation of the aggregate particles may also require the use of a specific binding agent if the bonding forces between the fibers of the base web and the coating particles are not sufficiently strong to ensure so strong bonds that the coating material can adhere in a secure manner to the web surface;

b) hot calendering in which the water contained in the aggregate particles is released during hot calendering under the hot calender roll thus improving the formation of hydrogen bonds between the aggregate particles of the coating material (this does not exclude the use of bond-formation-promoting additives) and the paper web, as well as the formation of interparticle bonds. The test results of this latter technique have been positive.

In FIG. 7 is shown a further embodiment of the invention suited for exploiting the above-described phenomenon.

Herein, the coating is applied to the web 11 by means of an applicator 26 using any of the above-described techniques. Next after the applicator 26 is placed a calender in which the roll 27 facing the coated side of the web or the roll 28 facing the uncoated side of the web or even both rolls are hot rolls. In addition to the hot rolls, steam or treatment chemicals may be applied to the web, before or after the coat application. Calendering is carried out immediately after application while the PCC is still in its amorphous state. As mentioned above, the coating material particles are amorphous when leaving the carbonization process. The coat application step may be complemented with binding agents, polymers, advantageously resins, latexes or natural binding agents that enhance the forces adhering the coating material particles to the paper web and bind the particles to each other. PCC aggregates are durable under the plastic deformation and can assume a smooth surface structure under the contact pressure of calendering. Also the individual aggregate particles are deformed. To avoid crystallization prior to calendering, the delay time from coat application to calendering must be sufficiently short. Since this delay time t is dependent on the properties of the PCC used, the web travel distance from the applicator to the calender is advantageously made adjustable so that the instant of calendering with regard to the progress of crystallization can be controlled. Under normal operating conditions, however, the time of crystallization is so long that the calendering must invariably be carried out while the coating is still in its clearly amorphous state.

In dry-coating tests performed, the paper web has been subjected to abrasion with a mechanical brush that fibrillates the web surface thus improving the adherence of coating material particles to the surface structure of the fiber matrix. The principle of the fibrillation handling is shown in FIG. 8. In this technique, the surface of the web 11 is abrasively treated with a brush 29 made from a suitable material, whereby microfibrils 30 are elevated from the fibers of the web. As known, rubbing of two dielectric materials against each other, e.g., by brushing movements creates static electricity.

In this manner, charging of a dry paper web with static electricity is relatively easy. Since dry paper falls midway on the scale of dielectric materials by its tribolectric properties, suitable brush materials are readily available for charging a paper web with positive or negative static electricity. This technique may be applied to alter the properties of a paper web surface, e.g., for a subsequent ion-blast treatment.

Web surface fibrillation by brushing improves the adherence of coating material particles by:
 a) increasing the specific surface area (through fibrillation)
 b) increasing the coarseness of the web surface
 c) generating static electricity.

During brushing, the surface of a paper web to be dry-coated is fibrillated in brushing pretreatment step (by separating the fibrils of the walls of the most superficial fibers of the fibrous web matrix so much that their one end remains attached to the basic fiber while the other end of the fibril remains hanging free).

The degree of surface-fibrillation can be controlled by altering the rotational speed of the brush and using different brushing pressures. The brush may be rotated along or reverse to the web travel. The paper web surface can be charged with static electricity by selecting the brush material so that a desired polarity, that is, positive or negative charge, is generated on the web surface. Analogously, the amount of static electricity generated herein can be controlled by altering the rotational speed of the brush and using different brushing pressures. Also analogously, the brush may be rotated along or reverse to the web travel.

While the use of calcium carbonate aggregate particles alone for treating a moving web is described in the foregoing examples, also other types of pigment particles may be used such as silicates, plastic pigments titan oxide and other mineral based pigments. However, the particle size under all conditions must be so small that the interparticle and particle-to-web adherence can be accomplished by van der Waals forces, possibly augmented with ion and hydrogen bonds serving to bond the fibers together with each other. The average size of the pigment particles should be in the range of 0.5–100 nm, advantageously 15–25 nm. The flocced cloudberry-like aggregates gates of particles should have an average diametral size of less than 500 nm, advantageously less than 100 nm. If the pigment particles are applied in dry form, the solids of the applied coating should preferably be greater than 80%.

In Finnish Patent Application No. 973775 is disclosed a method of forming a paper or board web or any other web of basically fibrous structure, in which method a moving web-formation substrate is covered with a raw material furnish comprising cellulosic pulp fiber, plant fiber or other materials suitable for making a paper, board or nonwoven product. The raw material furnish fed onto the web-formation substrate is passed into at least one compression nip for forming a firm web from the laid fibers of the raw material. Next, the web-formation substrate is connected to a first electrical potential and a second potential higher than said first potential is applied displaced from said first potential at a distance above that side of the web-formation substrate on which the raw material furnish is being fed, whereby an electric field is established between said potentials. The voltage between said first potential and said second potential is adjusted so high as to establish a corona discharge in the vicinity of said higher potential, said discharge being capable of causing an ion blast from said higher potential to said lower potential, whereby said ion blast transports the particulate raw material existing in the space between said potentials onto said web-formation substrate and assures the adherence of the raw material to the substrate. In conjunction with the above-described method, the particles of web treatment material can be fed in the web-formation step into the flow of the raw material fibers or, alternatively, directly onto the formed web in a manner described above.

In addition to a conducting wire or replacing the same, the counter electrode of the ion-blast apparatus may comprise a conducting belt, possibly a plurality of belts, and in special cases, a roll or set of rolls, provided that such an arrangement can offer a sufficiently long distance of web travel for applying the raw material. Also a construction with a non-conducting wire may be contemplated having at least one counter electrode placed under such a wire.

A product made according to the invention is characterized by having microscopic particles of the above-described mineral origin, advantageously small calcium carbonate particles, applied on its surface and/or in its interfiber spaces.

Thus, while there have been shown and described and pointed out fundamental novel features of the present invention as applied to preferred embodiments thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A paper product comprising a fiber layer containing cellulosic fiber, plant fiber or other material suitable for manufacturing a paper product, wherein on said fiber layer is disposed a layer of precipitated calcium carbonate particles of a size in the range of 0.5–100 nm, and wherein the layer of particles does not comprise a binder.

2. The product of claim 1, wherein said product contains particles of such an average size that they adhere to each other by van der Waals forces.

3. The product of claim 1, wherein the particles are of a size in the range of 15–25 nm.

* * * * *